United States Patent
Geng et al.

(10) Patent No.: US 9,276,956 B2
(45) Date of Patent: Mar. 1, 2016

(54) METHOD FOR DETECTING PHISHING WEBSITE WITHOUT DEPENDING ON SAMPLES

(71) Applicant: Computer Network Information Center, Chinese Academy of Sciences, Beijing (CN)

(72) Inventors: Guanggang Geng, Beijing (CN); Bo Hong, Beijing (CN)

(73) Assignee: Computer Network Information Center Chinese Academy of Sciences, Beijing (CN)

( * ) Notice: Subject to any disclaimer, the term of this patent is extended or adjusted under 35 U.S.C. 154(b) by 0 days.

(21) Appl. No.: 14/413,476

(22) PCT Filed: Dec. 20, 2012

(86) PCT No.: PCT/CN2012/087040
§ 371 (c)(1),
(2) Date: Jan. 8, 2015

(87) PCT Pub. No.: WO2014/036801
PCT Pub. Date: Mar. 13, 2014

(65) Prior Publication Data
US 2015/0200963 A1 Jul. 16, 2015

(30) Foreign Application Priority Data
Sep. 7, 2012 (CN) .......................... 2012 1 0333169

(51) Int. Cl.
*H04L 29/06* (2006.01)
*G06F 21/51* (2013.01)
(Continued)

(52) U.S. Cl.
CPC ...... *H04L 63/1483* (2013.01); *G06F 17/30864* (2013.01); *G06F 17/30887* (2013.01); *G06F 21/51* (2013.01); *G06F 21/55* (2013.01); *G06F 2221/2119* (2013.01)

(58) Field of Classification Search
CPC ..................... H04L 63/1483; G06F 17/30864; G06F 21/55; G06F 21/51; G06F 2221/2119
See application file for complete search history.

(56) References Cited

U.S. PATENT DOCUMENTS

| 7,769,820 B1 * | 8/2010 | Spies | ...................... H04L 63/08 709/218 |
| 8,826,444 B1 * | 9/2014 | Kalle | ................. H04N 21/8405 709/223 |

(Continued)

OTHER PUBLICATIONS

Wardman et al., Identifying vulnerable websites by analysis of common strings in phishing URLs, Oct. 2009, eCrime Researchers Summit, pp. 1-13.*

*Primary Examiner* — Kenneth Chang
(74) *Attorney, Agent, or Firm* — SV Patent Service

(57) ABSTRACT

A method for detecting a phishing website includes extracting a domain name from a target URL of a web page under investigation, and querying PageRank and/or Alexa ranking of the domain name; extracting a title character string from the title of the web page and matching the character string to phishing sensitive words; using the title of web page as a keyword to search on a search engine; querying whether Target URL and the web page in the search result with a same title as the web page under investigation have the same domain name server NS and server IP address to determine whether the website is a phishing website. The disclosed method utilizes common features of phishing websites and public resources on the Internet, and overcomes the difficulty in collecting phishing website samples, and is well adapted to detecting phishing aimed at new target websites.

13 Claims, 1 Drawing Sheet

(51) Int. Cl.
*G06F 21/55* (2013.01)
*G06F 17/30* (2006.01)

(56) References Cited

U.S. PATENT DOCUMENTS

| | | | | |
|---|---|---|---|---|
| 2006/0123464 A1* | 6/2006 | Goodman | H04L 63/1416 | 726/2 |
| 2006/0206455 A1* | 9/2006 | Kronberg | G06F 17/30696 | |
| 2007/0294352 A1* | 12/2007 | Shraim | G06Q 10/107 | 709/206 |
| 2008/0133540 A1* | 6/2008 | Hubbard | H04L 63/101 | |
| 2008/0172738 A1* | 7/2008 | Bates | G06F 17/30887 | 726/22 |
| 2008/0289047 A1* | 11/2008 | Benea | G06F 21/64 | 726/27 |
| 2009/0094677 A1* | 4/2009 | Pietraszek | H04L 29/12009 | 726/2 |
| 2009/0119268 A1* | 5/2009 | Bandaru | G06F 17/2745 | 705/7.12 |
| 2010/0186088 A1* | 7/2010 | Banerjee | G06F 21/51 | 726/23 |
| 2010/0287151 A1* | 11/2010 | Mustonen | G06F 17/30876 | 707/707 |
| 2011/0083182 A1* | 4/2011 | Emdee | G06F 21/51 | 726/23 |
| 2011/0282988 A1* | 11/2011 | Wang | H04L 41/12 | 709/224 |

* cited by examiner

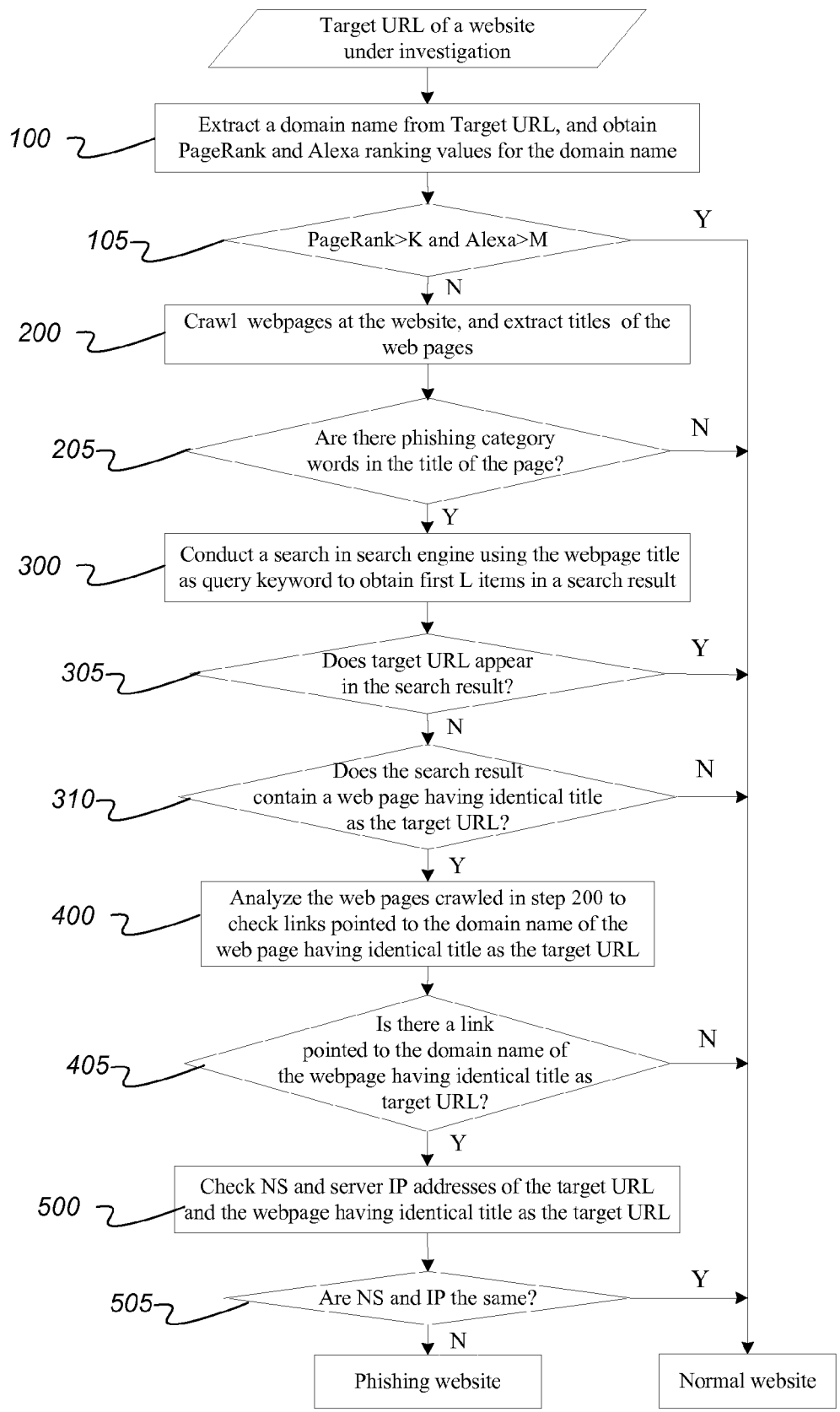

METHOD FOR DETECTING PHISHING WEBSITE WITHOUT DEPENDING ON SAMPLES

BACKGROUND OF THE INVENTION

The present application relates to technologies for providing Internet security, and in particular, to methods for detecting phishing websites. The disclosed methods utilize common characters of phishing websites and public resources of Internet.

Phishing is a network crime in which users are lured to visit a website which is very similar with a target website that the users intended to visit. The website then obtains the users' personal information that is inputted at the website. Because of the popularity and development of electronic commerce and Internet applications, phishing has caused increasingly serious losses to Internet users. Phishing fraud has become the biggest threat to Internet security, according to "Chinese Network Security Report in the first half of 2011" issued by 360 Safe™, the largest security company in China. The number of phishing attacks has increased significantly in recent years, as reported by International Anti-phishing Alliance. It has become particularly urgent to find effective phishing detection methods.

Phishing lures users to visit a website which is very similar with the target website that the users intend to visit, and then obtains users' personal information inputted in the website. As a network crime, phishing is similar to vagabond crimes in the real world: after a phishing website is set up, it may take only a few days or even a few hours before it disappears. Because of their short lives, phishing websites are rarely indexed and evaluated by internet resources such as search engine, ranking service, etc.

In another aspect, the nature of phishing determines that phishing websites need to decoy as a target websites; a phishing website needs to look very similar to the target website to misguide users as the genuine target in order to obtain illegal benefits. The primary similarity is in their web pages. To match the web content of the target websites, phishing detection need to collect web content from all target websites, which is a complex and endless job as new target websites continue to appear. On the other hand, the phishing decoy can be mainly in the similarity of their titles to the titles of the target websites. This type of similarity can be assessed by comparisons using public search engines, which saves the work of collecting content from target websites.

The current phishing detection field includes three main detection methods: blacklist detection technique, URL based on detection, and web-page-content based detection. The blacklist detection technique maintains and constantly updates a list of phishing sites through user evaluations or reports, to prevent additional users to visit phishing websites that have already been discovered. URL based on detection analyzes the structure and elements of the URL. This detection technique also uses registration and analysis information to determine whether a website is a phishing website. The URL based on detection is often used as a preliminary detection, while the final determination is usually based on web content. Finally, web-page-content based detection analyzes and determines similarity between a target web page and web pages at the potential phishing website.

Among the three above described detection technologies, the biggest drawback for the blacklist detection technique is in its time lag. The URL based on detection needs prior collection of phishing website's URL, and is incapable of detecting new phishing targets. Moreover, the web-page-content based detection requires prior knowledge of the target web-page and needs to collect a lot of phishing samples. This method is also incapable of thwarting phishing attacks against new targets.

In view of the above, there is a need for more accurate and more effective methods for detecting phishing fraud on the Internet.

SUMMARY OF THE INVENTION

The present application discloses a multi-scale phishing detection method to overcome the drawbacks of existing phishing detection techniques. The disclosed method does not require collecting information from target websites or collecting phishing sample data. The disclosed method can accurately detect and evaluate newly emerged phishing attacks against new target websites.

The present invention aims to provide a method for detecting a phishing website by analyzing common characters of phishing websites. The disclosed method is simple and easy to implement, and does not rely on a phishing sample database and phishing target information.

To overcome the drawbacks in the conventional phishing detection methods, the presently disclosed method for detecting phishing websites does not require samples of phishing websites. The disclosed method includes the steps of:

1) extracting a domain name from a target uniform resource locator (Target URL) of a web page under investigation, and querying PageRank and/or Alexa ranking of the domain name;

2) obtaining a title of the web page under investigation within a range of the PageRank and/or Alexa ranking, extracting a title character string from the web page, and matching the character string and phishing sensitive words;

3) for the web page that has its title character string matched to a phishing sensitive word, use the title of web page as a search keyword to search on a search engine;

4) if there is no Target URL in the search result produced by the search engine, and the search result includes a web page having the same title as the web page under investigation, querying if Target URL and the web page in the search result with the same title have the same domain name server NS and/or server IP address. If their domain name servers NS and/or server IP addresses are different, then the website under investigation is determined to be a phishing website.

Step 3) can also include crawling the web pages of Target URL, analyzing the crawled web pages, and determining if there exists a domain name link to the web page with the same title as the web page under investigation.

The phishing sensitive words can be automatically obtained using a statistical algorithm based on the frequency of phishing sensitive words.

The ranking range can be defined as a PageRank value>K and/or an Alexa value >M, wherein K and M are adjustable parameters, K is selected to be 1 or 2, and M is selected to be 0.

The web pages under investigation can be acquired by running a shell command wget Target URL in Linux system.

The titles of the web pages under investigation can be extracted content from the portion of the title character string between tags <title> and </title>.

The search result produced by the search engine after searching the title of web page include the first L items, in which L is not more than 30.

The domain name server NS and the server IP address can be queried by a dig command in a Linux system, a whois command, or a Bind command in Windows operating system.

Exemplified search engines include Google or Bing.

The presently disclosed invention can include one or more of the following advantages:

The present invention fully utilizes essential characteristics of phishing attack. The disclosed method is simple and easy to use; it not only overcomes the difficulty in collecting phishing website samples, but also is very suitable for detecting phishing aimed at new target websites. The disclosed method does not require information about phishing targets and a phishing sample database. The disclosed method comprehensively utilizes resources on the Internet such as the query interface to PageRank, a generic search engine, and Alexa ranking, etc., and is well adapted to detecting phishing aimed at new objects. This method analyzes URL and titles of web pages under investigation, to determine whether the web pages are for phishing.

BRIEF DESCRIPTION OF THE DRAWINGS

FIG. 1 is a flowchart of an exemplified method for detecting phishing websites without requiring samples of phishing websites.

DETAILED DESCRIPTION OF THE INVENTION

Further descriptions of technical implementations of the present invention are described below with drawings and specific examples. The search engines compatible with the present invention are not limited to the examples used below. A phishing data set is constructed by randomly selecting 800 phishing websites from Anti-Phishing Alliance of China in the first half year of 2012 and 1300 non-phishing websites at www followed by dmoz.org. The presently disclosed method has been experimentally verified and has demonstrated good detection performance: the recall rate of phishing detection is 100%, the precision rate is 100%, and the false-alarm rate is 0. The experimental results positively prove feasibility and validity of the disclosed method.

In one aspect, the disclosed method can use Internet resources such as Alexa ranking and PageRank. Alexa ranking refers to world ranking of websites based on NNT flows, which mainly includes two types: comprehensive ranking and classification ranking Alexa provides multiple evaluation indices, including comprehensive ranking, website visit volume ranking, and web-page visit volume ranking Alexa ranking is considered by most people regard as the authoritative evaluation index for website visit volumes. Alexa publishes a new website ranking every three months. This ranking is based on cumulative geometry average of the number of user clicks (Users Reach) and the number of page views (Page Views) in three months.

PageRank is part of Google™ ranking algorithm (ranking formula), which is used by Google™ to evaluate ranks and importance of web pages, and is Google's standard for evaluating a website. After blending with other factors such as Title identification and keywords identification, PageRank is used to adjust search results: those web pages with higher rank and importance are raised their ranking in search results, so as to improve the relevance and quality of search results.

The presently disclosed method determines whether a website under investigation is a phishing website by obtaining and analyzing PageRank, Alexa ranking, and the index and the rank of the website on a search engine. Although PageRank and Alexa ranking are only used as coarse filters, it has been discovered that phishing websites all have very low PageRank and rather low Alexa ranking or with no Alexa ranking FIG. 1 is an exemplified flowchart of the disclosed method for detecting a phishing website without relying on samples of phishing websites. As is shown in FIG. 1, the disclosed method for detecting phishing attacks can include one or more of the following steps:

First, a unique domain name is extracted from a target uniform resource locator (Target URL) of a web page under investigation (step 100). Then PageRank and Alexa ranking of the domain name are obtained (step 100). Extracting domain name refers to extracting the domain name from the domain name portion of Target URL. For example, for a URL "http://" followed by "item.taobao.com3358.tk/trade/batch_payment.htm.asp", the corresponding domain name is "com3358.tk". The public query interface for PageRank ranking is: "http://" followed by "toolbarqueries.google.com/", which can be obtained by any programming language. The query interfaces for Google™ and Alexa are opened to the public and unchanged. The public query of Alexa ranking is "http://" followed by "data.alexa.com/data?cli=10&dat=snba&url="+TargetUrl".

In general, if the value of PageRank ranking>K and the value of Alexa ranking>M, the website under investigation is not a phishing website (step 105). Otherwise, the disclosed proceeds to the next step (i.e. step 200) for further investigation (step 105). Generally, K=1 or 2. Considering phishing websites are usually live for several days, M is selected to be 0, which means that the website under investigation is assigned with an Alexa ranking K and M are adjustable parameters. It should be noted that although PageRank and Alexa are used only for coarse filtering, they are effective in removing the obvious normal websites from the candidates of suspicious websites.

Next, web pages at the website under investigation are crawled, for example, using command wget in Linux system (step 200). Titles of the web pages are extracted (step 200). For example, one way to extract the titles is locate the <title> tag and designate the content between <title> and </title> as the title. Web page crawling can only be conducted on web pages to be investigated. The crawling can be implemented with established techniques, for example, running shell command wget on Target URL in Linux system. A title of a web pages can be extracted by simply matching the character string of the web page and extracting the content between the <title> tag and the </title> tag as the title of the web page.

The character string of the title is next matched with phishing sensitive words (step 205). If there is phishing sensitive words in the character string (step 205), the method proceeds to the next step (step 300). If there is no phishing sensitive words in the character string (step 205), the website under investigation is determined to be a normal website (i.e. not a phishing website). Step 205 is based on the findings that phishing websites always try to mimic their respective target websites with high similarity, and their titles usually include phishing sensitive words in the eye-catching positions. Phishing sensitive words refer to a category of words that phishing websites often use as website keywords. These phishing sensitive words are the most frequently used words based on statistics of phishing databases, which can be automatically obtained by statistical algorithms. Internet phishing is a criminal activity for the purpose of profiteering, which usually has limited categories and targets, mainly related to financial payments and winning of lottery prizes. Phishing sensitive words in a particular example can include: bank, payment, log on, lottery prize, securities, group purchase, official websites, Taobao™, Tencent™, and so on.

Next, a search is conducted in a search engine using the title of the web page as the query keywords to obtain a search result (step 300). The search result includes first L items, in which, for instance, L<30, which represents the most popular hits that are noticed by general users in a search result.

If the web page under investigation exists in the search result, then the web page is determined to be a normal page (step 305). If the Target URL does not appear in the searching result, and there is a web page in the search result that has the same title as Target URL (step 310), then the web page under investigation is considered as suspicious web page, the method proceeds to next step (step 400) for further evaluation. Otherwise, the website under investigation is considered a normal website (step 305). Step 305 is based on the finding that phishing websites usually have the same titles as their respective intended target websites. For example, the title of a phishing website that targets Taobao™ also shows "Taobao-Tao! I like it" like what is displayed on the true Taobao™ site.

Next, web pages crawled in Step 200 are analyzed (step 400) to check if the web pages under investigation include links pointed to the domain name of at least one of the web pages in the search result with identical title as the web page under investigation. If such a link exists in a web page under investigation, the web page is considered suspicious of phishing (step 405), which prompts for further investigation. If not, the web page under investigation is considered as a normal web page (step 405). The basis for the above steps is that phishing websites usually include links to their corresponding target websites.

Next, the domain name servers NS and the server IP addresses of the Target URL and the web page in the search result with the same title as the Target URL are checked (step 500). If the server NS or the server IP address is the same, then the website under investigation is determined not to be a normal website instead of phishing website (step 505). Otherwise, the website under investigation is determined to be a phishing website (step 505).

The purpose of steps 500 and 505 is to identify new brand websites set up by known brand websites to prevent misjudgment. The query to NS and IP can be conducted for example using the command dig in Linux system, the command whois in Linux system, or a bind command (http: followed by "//www.isc.org/software/bind/"). The Windows version of Bind can be queried in Windows operating system.

Although the present invention is disclosed as above, it is not used to limit the present invention, any technical personnel of the technical field, within the spirit and scope of the present invention, can make arbitrary changes or equivalent replacement, so the protection scope of the present invention should be the scope defined by the claims of this application.

While this document contains many specifics, these should not be construed as limitations on the scope of an invention that is claimed or of what can be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or a variation of a sub-combination.

What is claimed is:

1. A method for detecting a phishing website without relying on samples of phishing websites, comprising the steps of:

extracting a domain name from a target uniform resource locator (Target URL) of a webpage at a website under investigation;

matching a title character string of the webpage under investigation to different phishing sensitive words;

if the title character string matches one of the phishing sensitive words, using the title character string as a query keyword to search on a search engine to produce a search result;

if the search result does not include the Target URL and if the search result includes a webpage with a same title as that of the webpage under investigation, analyzing the webpage under investigation by a computer system to check if there exists in the search result a link to a domain name of a webpage that has the same title as the webpage under investigation;

if the webpage under investigation includes a link to a domain name of a webpage that has the same title in the search result, determining the website associated with the webpage under investigation as a suspicious phishing site;

crawling webpages at the website under investigation;

extracting title character strings at the webpages; and analyzing the webpages to check if there exists a link to a domain name of a webpage that has the same title in the search result as the webpages under investigation.

2. The method for detecting a phishing website of claim 1, further comprising:

if the webpage under investigation does not include a link to a domain name of a webpage that has the same title in the search result, determining the website associated with the webpage under investigation as a normal site.

3. The method for detecting a phishing website of claim 1, further comprising:

if the search result includes the Target URL, determining the website associated with the webpage under investigation as a normal site.

4. The method for detecting a phishing website of claim 1, further comprising:

querying whether the Target URL and the webpage under investigation have a same domain name server NS and/or a server IP address; and if the Target URL and the webpage under investigation have different domain name servers NS and/or a server IP addresses, determining the website under investigation to be as a suspicious phishing website.

5. The method for detecting a phishing website of claim 4, further comprising:

if the Target URL and the webpage under investigation have the same domain name servers NS and/or a server IP addresses, determining the website associated with the webpage under investigation as a normal site.

6. The method for detecting a phishing website of claim 4, wherein the domain name server NS and a server IP address are queried by command dig or command whois in a Linux system, or Bind in a Windows operating system.

7. The method for detecting a phishing website of claim 1, wherein the phishing sensitive words are automatically obtained with a statistical algorithm based on frequencies of phishing sensitive words.

8. The method for detecting a phishing website of claim 1, wherein the webpages under investigation are crawled by running a shell command "wget Target URL" in a Linux system.

9. The method for detecting a phishing website of claim 1, wherein the title of the webpage under investigation is extracted by extract content in a character string between tags <title>and </title>.

10. The method for detecting a phishing website of claim 1, further comprising:
   after the step of extracting a domain name, querying PageRank and/or Alexa ranking values of the domain name; and
   if the PageRank ranking value and the Alexa ranking value of the webpage under investigation are in respective predetermined ranges, extracting the title character string from the webpage.

11. The method for detecting a phishing website of claim 10, further comprising:
   determining the website associated with the webpage under investigation as a normal site if the PageRank ranking value is bigger than 1 or 2 and the Alexa ranking value is bigger than 0 for the associated domain name.

12. The method for detecting a phishing website of claim 10, further comprising:
   determining the website associated with the webpage under investigation as a suspicious phishing website if the PageRank ranking value is less than 1 or 2 and the Alexa ranking value is bigger than 0 for the associated domain name.

13. The method for detecting a phishing website of claim 1, wherein the search result includes first L items, wherein L is not more than 30.

* * * * *